United States Patent
Arunachalam

(10) Patent No.: US 11,082,201 B1
(45) Date of Patent: Aug. 3, 2021

(54) LOOP PREVENTION

(71) Applicant: Cisco Technology, Inc., San Jose, CA (US)

(72) Inventor: Saravanan Arunachalam, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 23 days.

(21) Appl. No.: 16/746,793

(22) Filed: Jan. 17, 2020

(51) Int. Cl.
*H04L 7/04* (2006.01)
*H04W 56/00* (2009.01)

(52) U.S. Cl.
CPC ............. *H04L 7/04* (2013.01); *H04W 56/001* (2013.01)

(58) Field of Classification Search
CPC ................................ H04L 7/04; H04W 56/001
See application file for complete search history.

(56) References Cited

U.S. PATENT DOCUMENTS

| | | | |
|---|---|---|---|
| 10,084,559 B1* | 9/2018 | Devineni | H04J 3/0661 |
| 2012/0180103 A1* | 7/2012 | Weik, III | G06Q 10/00 726/1 |
| 2013/0301634 A1* | 11/2013 | Ehlers | H04L 12/4625 370/350 |

* cited by examiner

*Primary Examiner* — Kyaw Z Soe
(74) *Attorney, Agent, or Firm* — Lee & Hayes, P.C.

(57) ABSTRACT

This disclosure describes techniques for preventing message loops in communications among network devices. The techniques include preventing messages from being returned to a sending node and preventing messages from being sent more than once to any particular node. Such message loops may reverberate among network devices before triage efforts are able to stop the loop. As such, message loop prevention may help decrease the computational load among networked devices. At scale, the techniques may help prevent an exponential increase in data traffic that may propagate widely over the network. Loop prevention techniques may even prevent disabling of a network due to data traffic overload.

20 Claims, 9 Drawing Sheets

LOOP PREVENTION

TECHNICAL FIELD

The present disclosure relates generally to preventing loops of management messages in networks, thereby improving performance of the network.

BACKGROUND

Precision Time Protocol (PTP) (IEEE 1588) is a method for real-time clock synchronization in a distributed system. PTP is a packet-based method, where clock synchronization among nodes of the system is achieved through the transmission of packets between the nodes via a network. The nodes of the system are arranged in a master-slave hierarchy, where each slave synchronizes to a master. A grandmaster clock is at the top of the hierarchy, setting the time base for the system. The hierarchy of PTP systems is self-organizing based on properties of the clocks. For instance, the grandmaster clock may be selected based on being the best quality available clock.

PTP may serve systems with changing network topology. For instance, from time-to-time the grandmaster clock designation may change to a new clock in the system. Also, the master-slave hierarchy for any given node pairing may change as the network topology changes. While the changes are occurring, duplicate links between nodes may briefly exist. These duplicate links may have unintended consequences regarding the transmission of packets within the network. In some cases, message loops may occur. For instance, a management message might be forwarded along an unintended duplicate link. The management message may then further reverberate through additional nodes of the network. In a scaled topology a management message loop may exponentially increase data traffic. As deployment grows and system scale increases the management message loop problem may become acute, and may even potentially result in a meltdown of the system. Therefore, network operations may benefit from methods of preventing such message loops.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1:
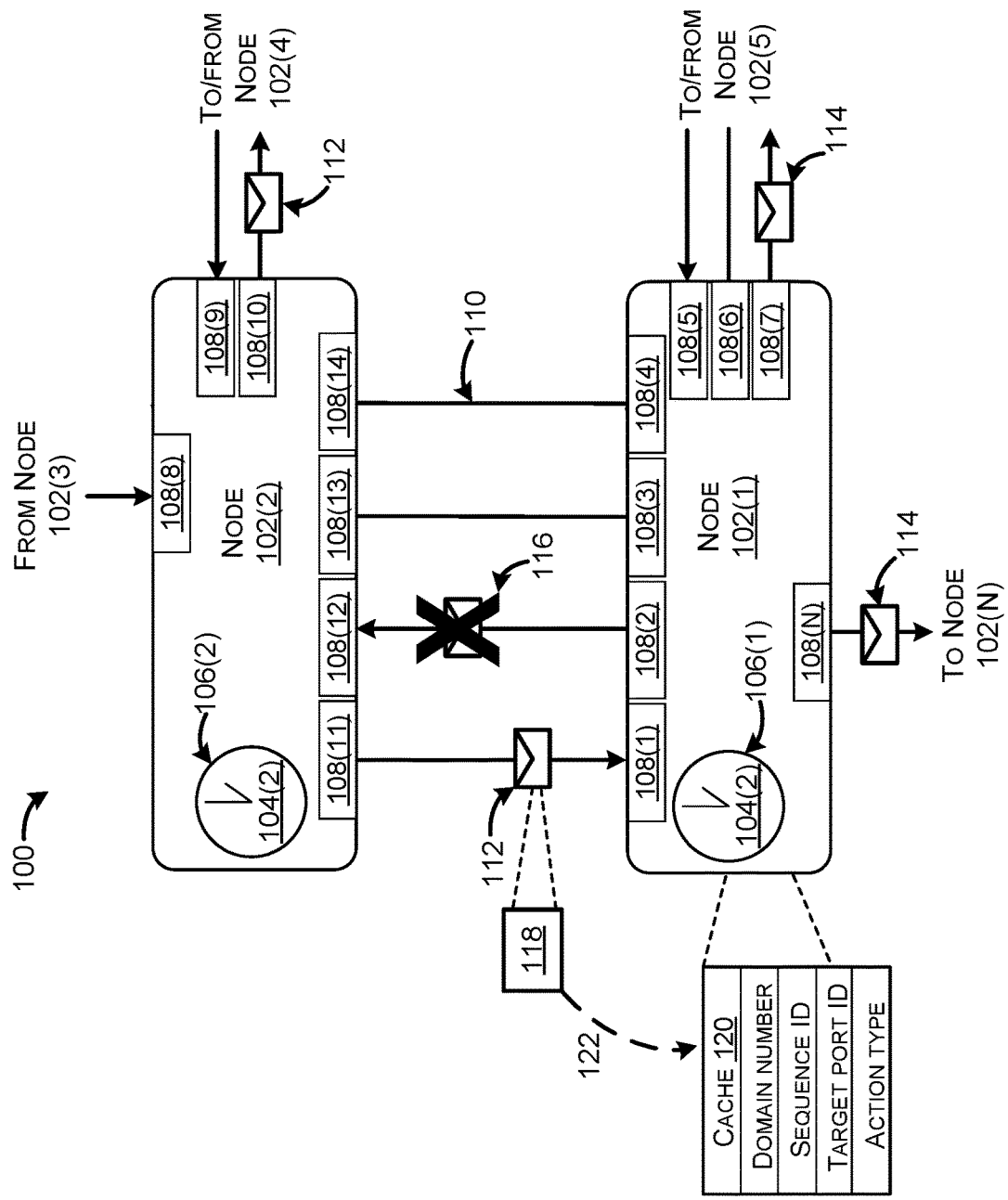
FIGS. 1, 2A, and 3 illustrate component diagrams with example environments in which loop prevention techniques may be employed between network devices, in accordance with the present concepts.

This disclosure describes, in part, a method that may be implemented at least in part by a first network node. The method may include receiving one or more packets sent via an egress port of a second network node. The one or more packets may represent a management message, for instance. The method may include identifying, from the one or more packets, a clock identifier (ID) associated with the egress port of the second network node and identifying an ingress port associated with a recipient network node to which the first network node is configured to forward the management message. Further, the method may include determining that the clock ID is associated with the ingress port. The method may also include, based at least in part on the clock ID being associated with the ingress port, refraining from sending the management message to the ingress port associated with the recipient network node.

This disclosure also describes, in part, another method that may be implemented at least in part by a first network node. The method may include receiving one or more packets sent via an egress port of a second network node. The one or more packets may represent a management message, for instance. The method may include identifying, from the one or more packets, a clock identifier (ID) associated with the egress port of the second network node and determining that the clock ID is unknown at the first network node. Further, the method may include, based at least in part on the clock ID being unknown at the first network node, refraining from sending the management message to recipient network nodes.

This disclosure also describes, in part, an additional method that may be implemented at least in part by a first network node. The method may include receiving one or more packets sent via an egress port of a second network node. The one or more packets may represent a management message, for instance. The method may include identifying a first ingress port of a third network node to which the first network node is configured to forward the management message, and forwarding the management message to the first ingress port of the third network node. Further, the method may include identifying a clock identifier (ID) associated with the first ingress port and a second ingress port to which the first network node is configured to forward the management message. However, the method may include determining that the clock ID associated with the first ingress port matches the clock ID associated with the second ingress port. Based at least in part on the clock ID of the first ingress port matching the clock ID of the second ingress port, the method may include refraining from forwarding the management message to the second ingress port.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for preventing a management message loop in a network. For example, a network may be configured to comply with a clock synchronization protocol. The clock synchronization protocol may perform clock synchronization (e.g., time synchronization) among clocks at nodes (e.g., devices) of the network. The clock synchronization protocol may be performed via messages sent between the nodes of the network. Unfortunately, a management message loop may inadvertently be created within the network. For instance, network topology may have duplicate links. A duplicate link may create a chance for a management message to be returned to a node from which the management message was received. Also, a duplicate link may create a chance for a management message to be sent more than once to a particular recipient node. To improve the operation of the network, loop prevention may include techniques to avoid returning a management message to the node from which the management message was received, or to avoid forwarding a management message to a particular recipient node more than once, for instance.

In some examples, the clock synchronization protocol may be a method for distributing time information (e.g., time, phase, frequency) to nodes in a network. The network may be packet-based (e.g., Ethernet). In this case, the clock synchronization protocol may also be packet-based, where messages of the protocol are embodied in one or more packets sent between nodes. An example packet-based clock synchronization protocol is Precision Time Protocol (PTP), also known as IEEE 1588 or IEC61588. An advantage of PTP includes relatively high clock accuracy, such as sub-microsecond (e.g., nanosecond) accuracy that may be required in some modern computing environments, including banking, stock markets, etc.

A distribution of time information under the clock synchronization protocol may follow a master-slave hierarchy. For example, "slave" and "master" may be viewed as roles that are filled by clocks at nodes (e.g., devices) of the network, rather than being a type of clock and/or computing device. As such, clocks may be viewed as a master clock or a slave clock. By extension, the clock roles may also be considered applicable to the nodes at which the clocks are located. For instance, a node with a master clock may be considered a master node, for the purposes of this disclosure. Furthermore, nodes may be communicatively coupled to each other via ports. A node may be a master relative to one neighbor node, while also being a slave relative to a different neighbor node. As such, a state of the different ports on any given node may be set as slave or master. Note that other states are also possible, such as "passive," "premaster," and "uncalibrated." However, an exhaustive description of clock synchronization protocol is beyond the scope of this disclosure.

Within the master-slave hierarchy, each slave may synchronize to a master. The clock synchronization protocol may provide for a grandmaster clock, which is at the top of the master-slave hierarchy and sets the time base for the system. The grandmaster clock may receive the time information from a global positioning system (GPS), for example. Any number of other clocks in the network may form a layered and/or web-like structure descending from the grandmaster clock, following the master-slave hierarchy. The other clocks may play different roles in the network, such as boundary clocks or slave-only clocks, for example. A slave-only clock may only receive clock synchronization protocol from a master, and therefore the ports of a node with a slave-only clock may be set to a slave state. Generally, a boundary clock may correspond to a switch, having at least one slave port and at least one master port. As such, the boundary clock may receive time information via a slave port (e.g., from a master node) and may pass along the time information via a master port (e.g., to a slave node). Additional roles played by clocks and/or nodes are contemplated.

In some examples, the clock synchronization protocol may be self-organizing. Stated another way, the clock synchronization protocol may determine the master-slave hierarchy for the network without input from a user. For instance, the clock synchronization protocol may use an algorithm to determine the master-slave hierarchy. Instances of the algorithm may run on one or more nodes of the network. The algorithm may potentially run on all nodes of the network. An example clock synchronization protocol algorithm is the Best Master Clock Algorithm (BMCA) which can be used in PTP.

Nodes in the network may use the clock synchronization protocol algorithm to determine whether to identify as a master node or a slave node. The algorithm may examine clock quality information to make such a master-slave determination. Examples of clock quality information may include the configurability, traceability, accuracy, and/or stability of a clock. In some examples, any given node may use the algorithm to examine clocks associated with ports of neighboring nodes to which the given node is linked. The given node may use the algorithm to determine whether the neighboring ports are associated with a higher quality clock than the given node. If the algorithm does not find a higher quality clock, the given node (and associated clock) may be identified as the master. In this instance, a state of the ports of the given node may be set to "master." Alternatively, if the algorithm does find at least one higher quality clock, the neighboring port with the highest quality clock may be identified as the master, and all other neighboring ports to which the given node is linked may be identified as slaves. In this instance, the state of the port of the given node that is linked to the master neighboring port may be set as "slave," and other ports of the given node may be set as "master." Note that the algorithm may make accommodations for complicated network topologies that create inconsistencies in the master-slave hierarchy. For example, a state of some ports may be set as passive, such as to prevent duplicate links between nodes. Also, in the case of cyclic paths in a network, the algorithm may reduce the topology to an acyclic graph. By systematically applying the algorithm through the nodes of the network, a clock at the top of the hierarchy at any given time may ultimately be determined. The clock at the top may be identified as the grandmaster clock, and may be the best clock (e.g., best quality clock) in the network. Note that in some instances, the best quality clock in the network may not be selected as the grandmaster clock, such as in cases of a complicated topology and/or depending on other criteria.

A clock synchronization protocol may employ different types of messages, embodied in one or more packets. The messages may contain material relevant to the clock synchronization of the clocks in the network. Some messages may be management messages, which provide and/or carry other types of information related to the clock synchronization protocol. Management messages may be used to read and write parameters in the nodes. For example, management messages may provide a mechanism to drive certain state changes, such as initialization, disabling a node, setting the time in the grandmaster clock, etc. Management messages may provide external visibility to data maintained within the clocks, and/or provide a mechanism to modify the data within the clocks, such as a synchronization interval, a subdomain name, etc. In PTP, management messages may be used to send GET, SET, Response, Command, and/or Acknowledge messages from one node to another. In some instances, any node can GET and SET parameters in any other node.

In some examples, management messages may be written and/or initiated by the grandmaster clock. Additionally or alternatively, management messages may be written and/or initiated by management nodes, which may not take part in the master-slave hierarchy and/or clock synchronization. Furthermore, it is conceivable that any device in the network may be able to initiate a management message. Since the routing of management messages may be governed by somewhat different rules than master-slave hierarchy of the clock synchronization messages, for example, management messages may be more prone to message looping. For example, a clock synchronization protocol may specify that management messages are received by ports in master, slave, uncalibrated, or premaster states. In other words, the management messages may be received at all port states except passive and disabled. Also, a clock synchronization protocol may specify that management messages are sent out on potentially all other ports that are in master, slave, uncalibrated, or premaster states. In other words, the management messages may be sent from all port states except passive and disabled. However, in the case where there is more than one link with a neighboring (e.g., peer) node, this could create a temporary loop, when ports go through state changes.

As noted above, a topology of the network may change over time. A new, better quality clock may become available to the network, for instance. Therefore, a grandmaster clock change may be warranted. A topology change may cause other potential master and/or slave changes within the network. As such, the algorithm may run repeatedly, upon user request, at regular intervals, and/or constantly to update the master-slave hierarchy. When a change in the master-slave hierarchy occurs, the algorithm may in turn cause state changes at any number of ports in the network. In some examples, the algorithm may proceed by changing the port states one-by-one and/or otherwise not simultaneously. As such, there may be a brief period when two or more ports at a node are in a state capable of receiving and/or forwarding management messages. Therefore, in this brief period, a message loop may occur.

In a case where a management message is sent twice to a node, and/or returned to a node from which it came, the management message may bounce around the network many times. As suggested above, in a scaled topology a message loop may exponentially increase data traffic. As deployment grows and system scale increases the message loop problem may become acute. The message loop problem may even potentially result in a meltdown of the system. Some existing PTP networks have been impacted by such management message loop "storms." Therefore, network operations may benefit from mitigating the damaging effects of such message loops. In particular, methods of preventing management message loops from forming in the first place may be beneficial to network operations.

In some cases, loop prevention techniques may include review of information contained in a management message or information stored at a node to help determine whether to forward any particular management message from any given port. For instance, loop prevention techniques may use identifiers (IDs) associated with the nodes and/or carried with the messages to avoid message loops. An example ID is a clock ID. Clock IDs may be unique to any particular clock in the network. A management message may carry the clock ID associated with a master port as it travels to a slave port at a receiving node. The receiving node may then learn the clock ID of the sending node from the management message. The receiving node may then use the clock ID to determine whether to forward the management message to various other ports. For example, the receiving node may refrain from forwarding the management message to another port with a clock ID that matches the clock ID of the management message. This may help prevent the message from being returned to the sending node. In a second example, the receiving node may refrain from forwarding the management message to any port if the clock ID in the management message is unknown. For instance, if the receiving port has no prior knowledge of the clock ID, it may be unable to discern whether other nodes to which it is connected match the sending node. Therefore, out of caution, the receiving node may simply discard the management message to avoid the potential of creating a loop. In a third example, the receiving node may refrain from forwarding the management message to any port with a clock ID that matches a clock ID of another port to which the receiving node has forwarded the management message. Stated another way, the receiving node may refrain from forwarding the management message to more than one port with the same clock ID.

To summarize, techniques for preventing message loops in networks are needed to prevent system-crippling storms of reverberating messages. The prevalence of such storms is expected to increase as networks scale up and as more and more types of devices within networks are programmed to initiate management messages. A proactive solution is to prevent them from occurring in the first place. Several techniques for preventing message loops are considered, including preventing a message from being returned to the node from which the message was received, or preventing forwarding a message to a particular recipient node more than once.

Although the examples described herein may refer to a node (e.g., switch) as the point of generation of loop prevention, the techniques may generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present loop prevention concepts. Example environment 100 may include nodes 102. The nodes 102 may have clocks 104, which may be associated with clock IDs 106. The nodes 102 may have ports 108. The nodes 102 may be communicatively coupled to other nodes via links 110 between the ports 108. In FIG. 1, only one link 110 is labeled to avoid clutter on the drawing page. The links 110 are illustrated as lines, some of which include arrows, which will be described below. In FIG. 1, due to space limitations of the drawing page, some nodes are simply represented by an associated link. For example, a link to port 108(8) on node 102(2) represents a connection to node 102(3), which is not drawn in FIG. 1. Although it is not shown, it may be presumed that the link connects to a port of node 102(3).

The example environment 100 illustrated in FIG. 1 may represent a component diagram of a PTP network. In this example, the nodes 102 may be manifest as switches, routers, and/or various other types of computing devices. In terms of the PTP network, the clocks 104 may also be considered grandmaster clocks, boundary clocks, and/or slave-only clocks, as described above. For instance, referring to FIG. 1, nodes 102(1), 102(2), 102(4), and 102(5) may have boundary clocks 104, and therefore may act as both master and slave nodes depending on a current configuration. Node 102(3) may have a grandmaster clock, and therefore may act as a master node. Node 102(N) may have a slave-only clock(s). Here, "N" represents any number of nodes 102 (which may have slave-only clocks) that are subordinate to node 102(1) in the master-slave hierarchy of the network.

In FIG. 1, the link at port 108(8) is depicted as an arrow entering port 108(8), coming from node 102(3). Since node 102(3) is considered to have the grandmaster clock in this instance, port 108(8) is in a slave state (e.g., slave port) and receives information (e.g., time information) and/or messages (e.g., management messages) from node 102(3). A link between port 108(11) and port 108(1) is depicted as an arrow entering port 108(1). In this instance, port 108(11) is set in a master state and port 108(1) is set in a slave state, such that information on this link is travelling from node 102(2) to node 102(1). Similarly, ports 108(2), 108(7), 108(10), and 108(N) are set in a master state. Meanwhile, ports 108(5), 108(9), and 108(12) may transition to an intermediate state (e.g., due to a clock synchronization protocol algorithm state change). The links at ports 108(3), 108(4), 108(6), 108(13), and 108(14) do not feature arrows at either end, and these ports may be considered to be in a passive state.

FIG. 1 may be viewed as an illustration of an example loop prevention scenario. In this scenario, a management message 112 may be sent from port 108(11) of node 102(2) to port 108(1) of node 102(1). Since port 108(10) is also a master port of node 102(2), the management message may also be sent from port 108(10) of node 102(2) to node 102(4). Upon receipt of the management message 112 by nodes 102(1) and 102(4), the nodes 102 may attempt to forward the management message 112 to various other nodes 102 in the network.

As shown in FIG. 1, the ports 108 of node 102(1) that are set in a "master" state include ports 108(2), 108(7), and 108(N). Therefore, these ports may be viewed as available for forwarding the management message 112. The forwarded management message is indicated at 114. For example, ports 108(7) and 108(N) are depicted as sending the forwarded management message 114 to nodes 102(5) and 102(N). However, it may not be appropriate to forward the management message 112 from every master port 108 at any given node 102. For instance, forwarding the management message 112 from port 108(2) to port 108(12) of node 102(2) may result in a message loop. In this instance, the forwarded management message would be received at node 102(2), which might then attempt to forward it again via master ports of node 102(2). Since node 102(2) had already forwarded the management message 112 via port 108(10), forwarding the incoming message from port 108(12) would result in a second instance of the management message being forwarded from port 108(10) to node 102(4). It is possible to imagine multiple similar reverberations of the management message 112 cascading across the network. Such message loops may run rampant among network devices before triage efforts are able to find and/or abate the problem. Therefore, it may be advantageous to refrain from forwarding the message from port 108(2) back to node 102(2), as indicated by the "X" at 116. Refraining from forwarding the message (116) back to node 102(2) would prevent the message loop, in this case.

It may be advantageous for node 102(1) to be able to determine whether to forward a management message 112 from any given master port, rather than blindly forwarding the management message 112 on all master ports. However, a node 102 may only have knowledge of various ports 108 to which it is linked in the network, and not the neighboring nodes 102. Stated another way, a node 102 may not be able to "see" a neighbor node 102 behind any given neighbor port 108. Therefore, a node 102 may benefit from a method of learning whether a management message 112 should be forwarded on any particular link 110. For instance, the node 102(1) may be able to examine message information 118 contained in one or more packets of the management message 112.

The message information 118 may include a variety of information related to clock synchronization and/or clock synchronization protocol. The message information 118 may include contents, instructions, details regarding a network path of the management message 112, security and/or identification information, etc. The message information 118 may include GET, SET, Response, Command, and/or Acknowledge messages, and/or instructions regarding a state change, for instance. In some implementations, at least a portion of the message information 118 may be added to a cache 120 of node 102(1) when management message 112 is received at port 108(1), as indicated at arrow 122. For example, the domain number, sequence ID of the management message 112, target port ID of the management message 112, and action type of the management message 112 shown in cache 120 in FIG. 1 may be taken and/or derived from information 118. In some cases, the cache 120 may be used to check subsequent management messages to determine if the subsequent management messages have been looped back. If a subsequent management message is found to be looped, it may be dropped.

In some cases, details regarding the network path of the management message 112 may include a record of the path that the management message 112 has followed. For example, the clock IDs 106 of nodes 102 through which management message 112 has passed may be added to the message information 118. Thus, when the management message 112 arrives at node 102(1), the message information 118 may contain the clock ID 106(2) of node 102(2). Upon examination of the message information 118, node 102(1) may learn that the sender of the management message 112 was associated with clock ID 106(2). In this manner, node 102(1) may choose not to return the management message 112 to any port 108 associated with clock ID 106(2). Stated another way, since the egress port 108(11) from which node 102(1) received the management message 112 was associated with clock ID 106(2), node 102(1) may refrain from forwarding the management message (116) to ingress port 108(12), since port 108(12) is associated with the same clock ID 106(2) as the egress port 108(11). In this example, node 102(1) may determine the clock ID of port 108(12) from a database, an example of which will be described below.

Figure 2A:
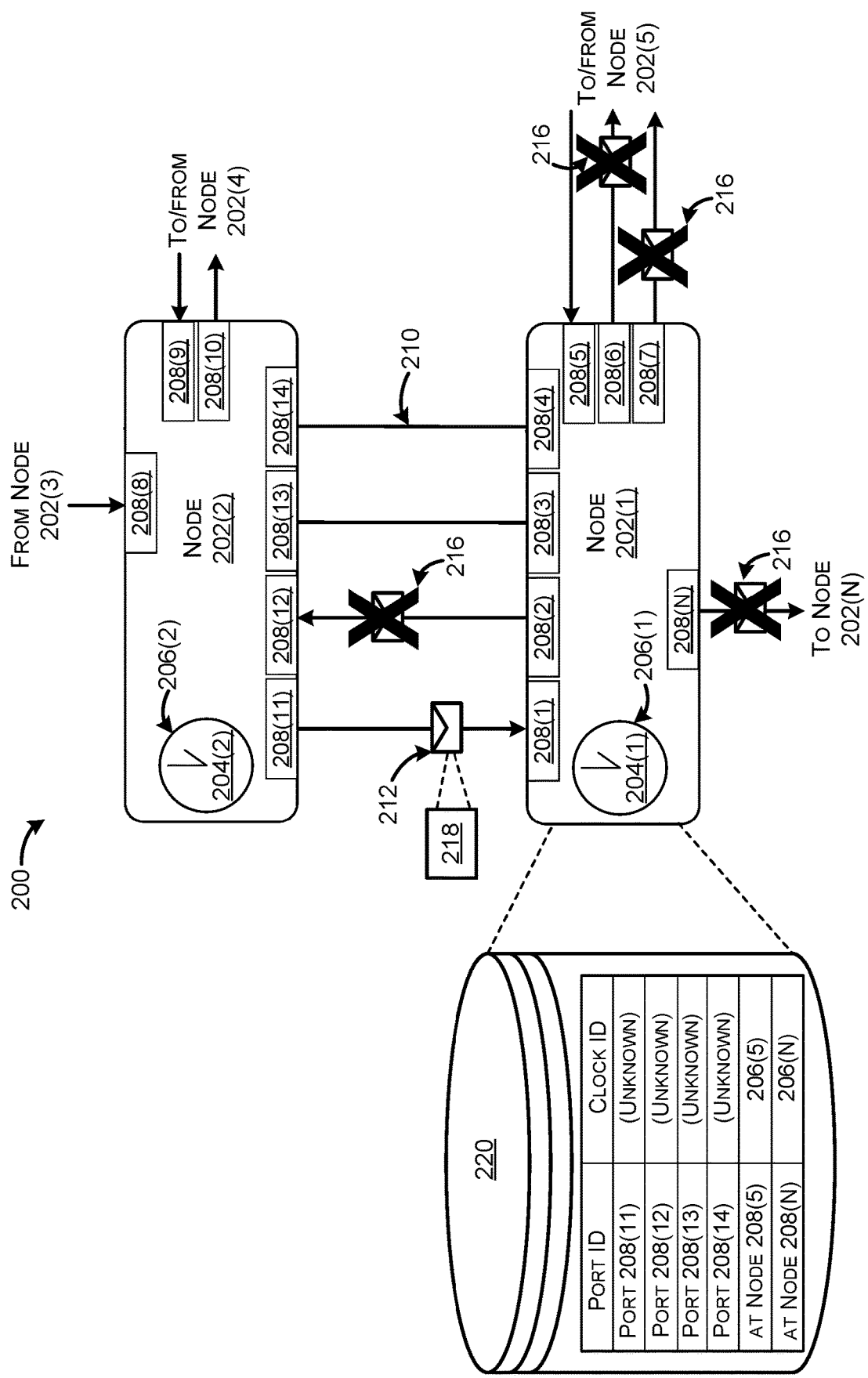
Figure 2B:
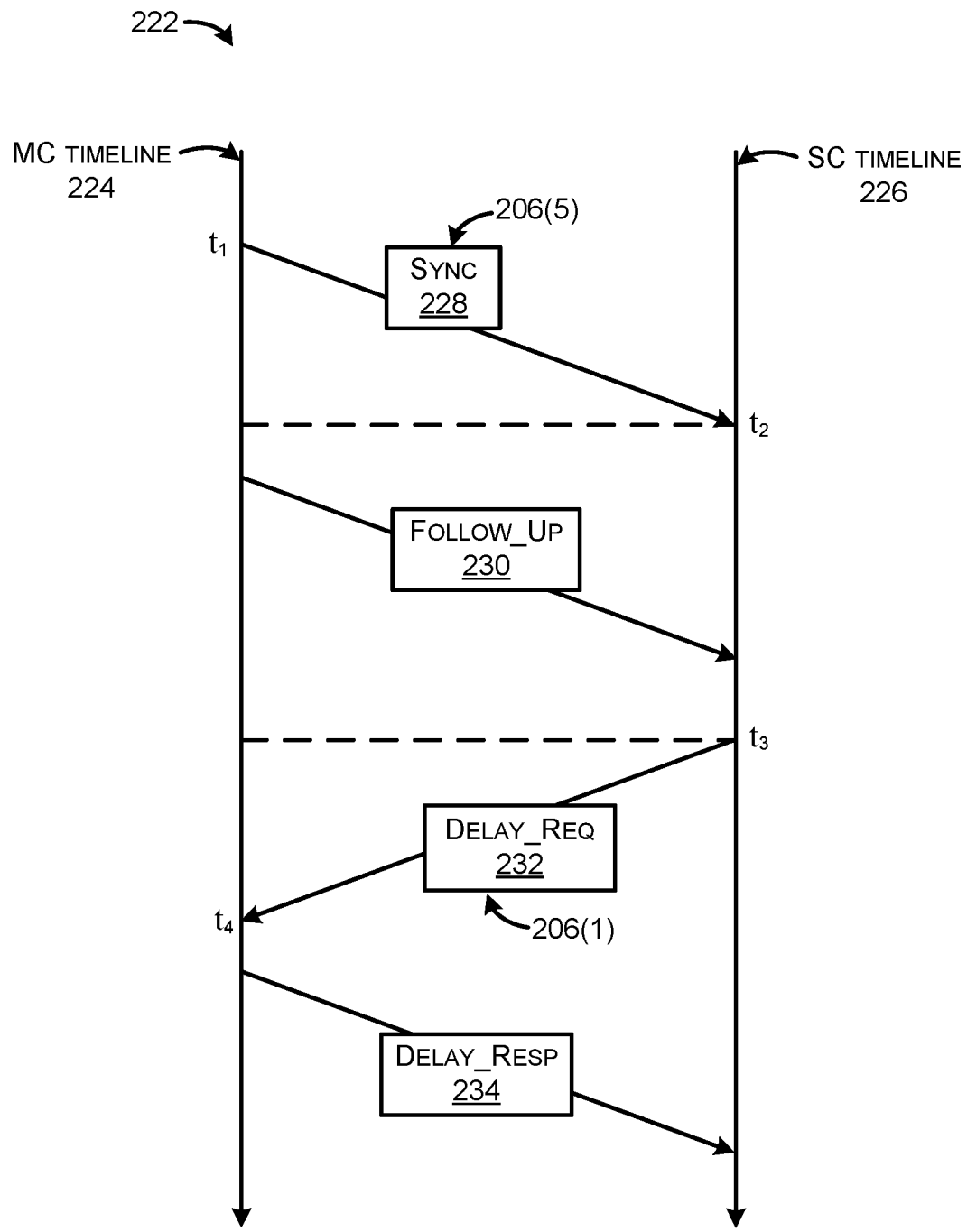
FIG. 2B illustrates an example communication sequence that relates to the component diagram illustrated in FIG. 2A. The example communications may be employed as part of communications between the example network devices illustrated in FIG. 2A, in accordance with the present concepts.

FIGS. 2A and 2B collectively illustrate an additional example loop prevention scenario. FIG. 2A shows an additional example environment 200 in accordance with the present loop prevention concepts. Some elements of FIG. 2A may be similar to elements described above relative to FIG. 1. Like numbering is used to indicate like elements. For instance, example environment 200 may include nodes 202, which may be similar to nodes 102 shown in FIG. 1. Therefore, for sake of brevity, not all elements of FIG. 2A will be described in detail.

In FIG. 2A, nodes 202 may include clocks 204, which may have clock IDs 206. Nodes 202 may also include ports 208. The nodes 202 may be communicatively coupled to other nodes via links 210 between the ports 208. In the example scenario depicted in FIG. 2, a management message 212 may be sent from port 208(11) of node 202(2) to port 208(1) of node 202(1). Upon receipt of the management message 212, node 202(1) may attempt to forward the management message 212 to various other nodes 202 in the network.

In some implementations, a node 202 may keep a database 220 of information associated with a clock synchronization protocol. As illustrated in FIG. 2A, database 220 of node 202(1) may include information such as ports 208 referenced to clock IDs with which the ports 208 are associated. For instance, database 220 shows that port 208(12) is associated with clock ID 206(2). The information that is recorded in database 220 may be learned through communications of the clock synchronization protocol. An example of clock synchronization protocol communications is provided in FIG. 2B.

FIG. 2B depicts a communications graph 222. The communications graph 222 includes a master clock (MC) timeline 224 and a slave clock (SC) timeline 226. In this example, the master clock may be associated with node 202(5), and the slave clock may be associated with node 202(1). FIG. 2B depicts several messages being exchanged between the MC timeline 224 and the SC timeline 226, including SYNC 228, FOLLOW_UP 230, DELAY_REQ 232, and DELAY_RESP 234. In some cases, the messages depicted in FIG. 2B may be part of the clock synchronization protocol. The message sequence may be used to synchronize clocks of node 202(5) and node 202(1) in this case. For instance, through the message sequence, node 202(1) may learn the timepoints $t_1$, $t_2$, $t_3$, and $t_4$. Node 202(1) may use the timepoints to synchronize clock 204(1) to clock 204(5) of node 202(5) by backing out latencies involved with the sending of the messages. The clock synchronization calculation is available elsewhere and is beyond the scope of this disclosure.

Aside from accomplishing clock synchronization, the exchange of messages in FIG. 2B may also be viewed as establishing communications between nodes 202(5) and 202(1). For instance, the exchange of messages may be viewed as a "handshake" between nodes 202(5) and 202(1). The handshake may transfer identifying information that is useful for communications between nodes 202(5) and 202(1). The information may be stored in database 220 (FIG. 2A).

In some examples, messages between nodes 202 may include identifying information about an egress port from which the message is sent. For instance, the identifying information may include a clock ID associated with the egress port. Referring to FIG. 2B, SYNC 228 may carry clock ID 206(5) of node 202(5), which would be associated with any ports 208 of node 202(5). Therefore, as shown in FIG. 2A, clock ID 206(5) may be included in database 220, associated with ports at node 208(5). In this manner, the database 220 may accumulate identifying information that is useful for communications between node 202(1) and other nodes 202 of the network. Similarly, DELAY_REQ 232 may carry clock ID 206(1) of node 202(1) from port 208(5). Therefore, node 202(5) may learn the clock ID 206(1) associated with port 208(5), and may record the clock ID 206(1) in a database of node 202(5). In some cases, any particular clock ID 206 may be represented as 8 bytes. Furthermore, the 8 bytes may be contained within a general port ID of the egress port.

Referring again to FIG. 2A, the database 220 may be used in loop prevention techniques. For example, node 202(1) may receive management message 212 at port 208(1) from port 208(11). Node 202(1) may attempt to forward the management message 212 to various other nodes 202 in the network. However, in this instance, management message 212 may reference clock ID 206(2) of egress port 208(11), but clock ID 206(2) may be "unknown" to node 202(1) as suggested in database 220. For instance, port 208(1) may not have currently established communications with port 208(11), such as through the process described relative to FIG. 2B. Therefore database 220 may not include information associated with communications, such as clock ID 206. In cases where the clock ID 206 of the egress port 208 is unknown to the receiving node 202, the node may choose not to forward the management message 212 to any other node 202 out of caution. As shown in FIG. 2A, node 202(1) may refrain from forwarding the management message (216) to node 202(2), node 202(5), and node 202(N). Node 202(1) may simply discard the management message 212. In this case, refraining from forwarding the management message (216) is intended to prevent an inadvertent message loop.

Figure 3:
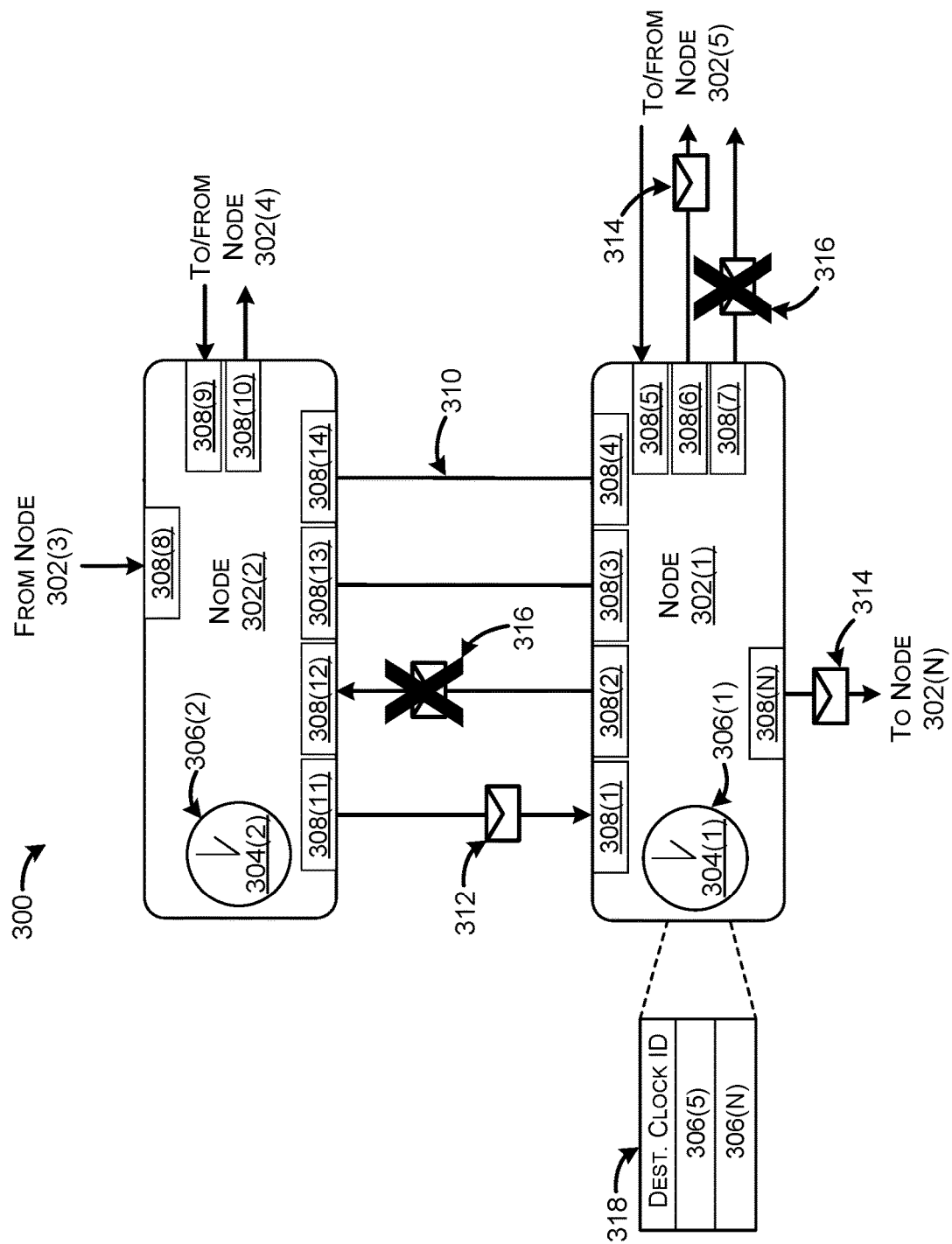

FIG. 3 illustrates a third example environment 300 and a third example loop prevention scenario in accordance with the present loop prevention concepts. Some elements of FIG. 3 may be similar to elements described above relative to FIGS. 1 and 2A. Therefore, for sake of brevity, not all elements of FIG. 3 will be described in detail. In the example scenario depicted in FIG. 3, a management message 312 may be sent from port 308(11) of node 302(2) to port 308(1) of node 302(1). Upon receipt of the management message 312, node 302(1) may attempt to forward the management message 312 to various other nodes 302 in the network. For example, node 302(1) sends the forwarded management message 314 to node 302(5) from port 308(6), and to node 302(N) from node 308(N). Node 302(1) does not return the management message to the sending node from port 308(2), as indicated at 316.

In some examples, node 302(1) may keep a record of the forwarding of management message 312. For instance, node 302(1) may construct a hash table 318. The hash table may be used to determine whether to forward the management message 312 to any particular node 302. The hash table 318 may include a record of the clock IDs 306 (e.g., destination clock IDs) of ports 308 to which a forwarded management message 314 has been sent, for example (e.g., the clock ID may be the hash). As shown in FIG. 3, the destination clock IDs in the hash table 318 include clock ID 306(5) and clock ID 306(N). In general, various methods for storing information related to management messages are contemplated. In some implementations, a hash table, cache, lookup table, and/or database may include a variety of information regarding the movement of management messages and/or the clock IDs 306 associated with ports 308. For example, the hash table and/or a database may identify receiving ports 308, whether or not a management message was forwarded to any particular port, etc. The example cache 120 shown in FIG. 1, database 220 shown in FIG. 2A, and example hash table 318 shown in FIG. 3 are not meant to be limiting.

Returning to the example in FIG. 3, as node 302(1) attempts to forward the management message 312 to various other nodes 302 in the network, node 302(1) may proceed updating hash table 318. As noted above, node 302(1) may refrain from forwarding the management message (316) to the sending node from port 308(2), then may forward the management message (314) from port 308(6) to node 302(5). Node 302(1) may systematically attempt to forward the management message 312 to various other nodes 302 in the network, one-by-one. In the example shown in FIG. 3, note that multiple master ports 308 are available for sending messages to node 302(5). As such, duplicate links 310 may be open between nodes 302(1) and 302(5), in this instance. After successfully forwarding the management message (314) from port 308(5), node 302(1) may attempt to forward the management message 312 from port 308(7). However, node 302(1) may determine that the clock ID 306 of the peer port associated with port 308(7) matches a clock ID associated with a port that has already received the forwarded management message 314. For instance, node 302(1) may determine that port 308(7) is linked to a peer port associated with clock ID 306(5). Node 302(1) may also learn from hash table 318 that the management message has already been forwarded (314) to a peer port associated with clock ID 306(5), such as from egress port 308(6). Therefore, node 302(1) may refrain from forwarding the management message (316) from port 308(7). In this manner, loop prevention techniques may be utilized to prevent sending management messages on duplicate links between two nodes. Stated another way, loop prevention techniques may ensure that messages are sent on only one link of redundant links that are active at the peer end. Note that the example depicted in FIG. 3 does not necessarily include a "loop," where one message might return to the same node. Accordingly, in this disclosure "loop" or "loop prevention" may be used to refer to any instance of an inappropriately forwarded message causing undue network traffic or the prevention of such inappropriate message forwarding.

To summarize, the loop prevention techniques described herein may improve network performance. The techniques may prevent a variety of ways that message loops may be initiated, including but not limited to preventing messages from being returned to a sending node and preventing messages from being sent more than once to any particular node. The techniques may help prevent an exponential increase in data traffic over the network. Loop prevention techniques may even prevent disabling of a network due to data traffic overload.

Figure 4:
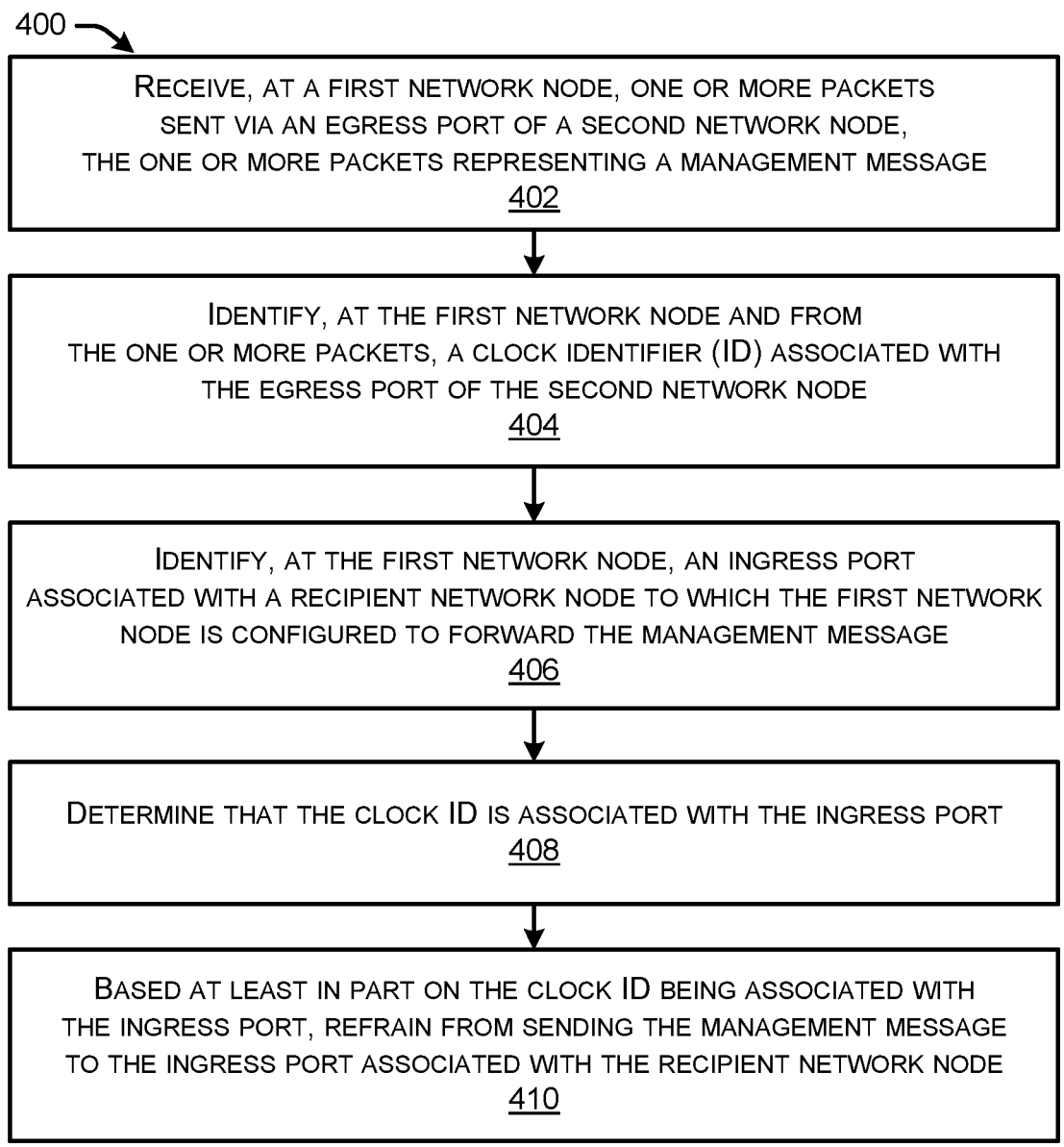
FIGS. 4-6 illustrate flow diagrams of example methods for the use of loop prevention techniques as a part of communications among network devices, in accordance with the present concepts.
Figure 5:
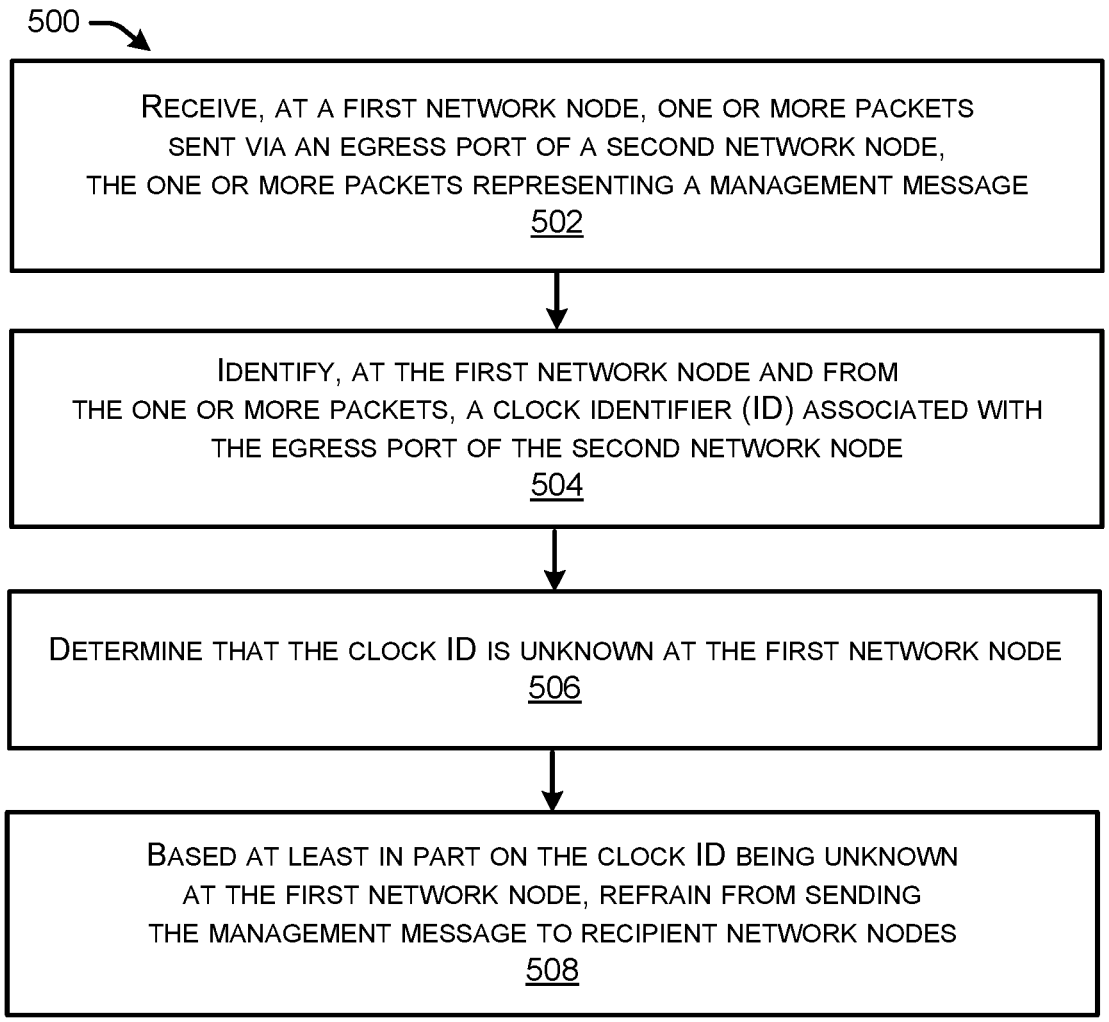
Figure 6:
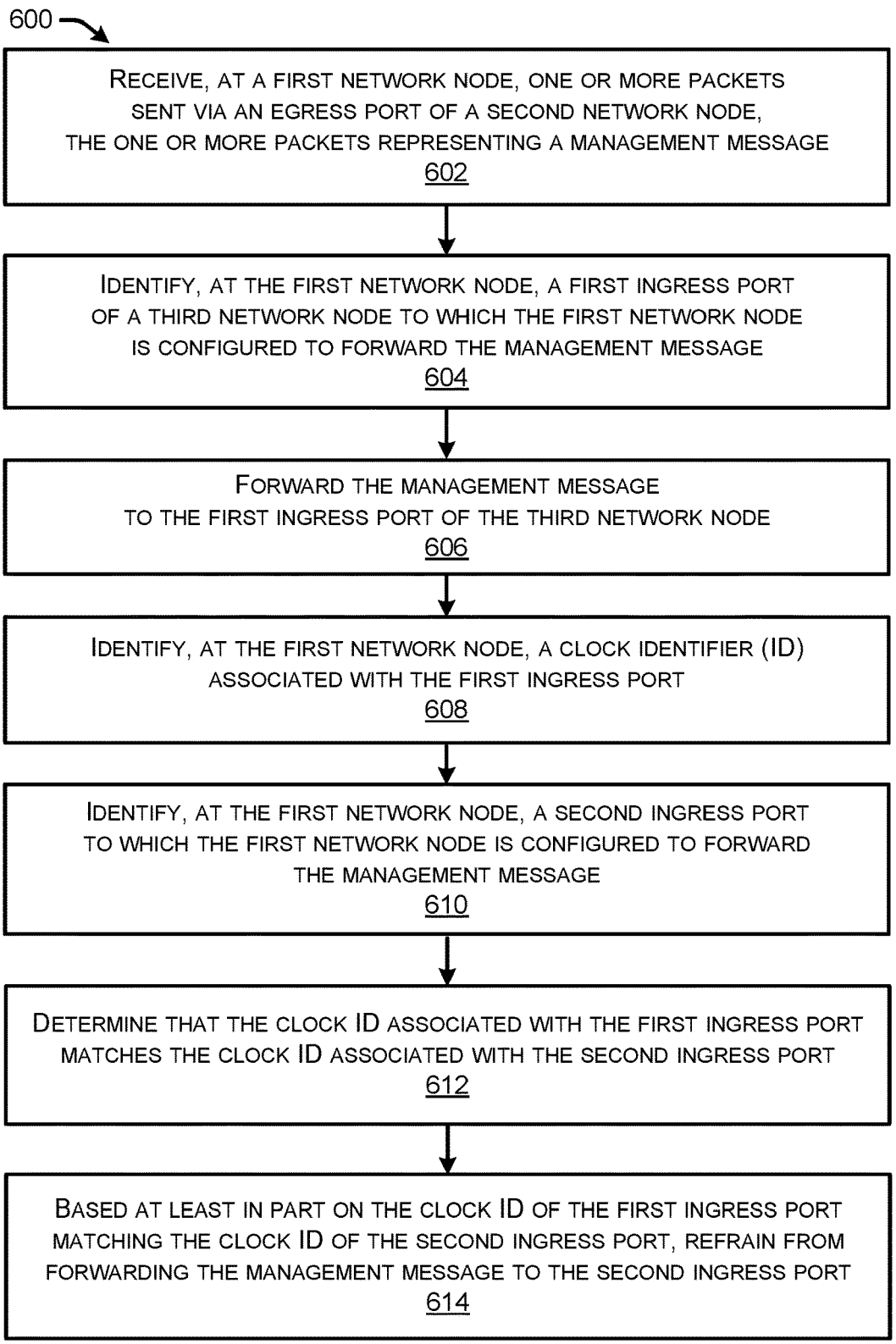

FIGS. 4-6 illustrate flow diagrams of example methods 400, 500 and 600 that include functions that may be performed at least partly by a network device, such as node 102(1), 202(1), and/or 302(1) described relative to FIGS. 1-3. The logical operations described herein with respect to FIGS. 4-6 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 4-6 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 4 illustrates a flow diagram of an example method 400 for network devices to perform loop prevention techniques. Method 400 may be performed by a first network node (e.g., computing device, switch, router) communicatively coupled to a second network node, for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may receive, at a first network node, one or more packets sent via an egress port of a second network node, the one or more packets representing a management message. The management message may be associated with a clock synchronization protocol. The clock synchronization protocol may be used to synchronize clocks within a network that includes the first network node and the second network node, for example. In some cases, the first network node may be configured to receive the management message via a slave port of the first network node and forward the management message via master ports of the first network node. The method 400 may configure certain ports of the first network node as the slave port and the master ports in accordance with the clock synchronization protocol.

At 404, method 400 may identify, at the first network node and from the one or more packets, a clock identifier (ID) associated with the egress port of the second network node.

In some examples, the clock ID may differentiate a clock associated with the second network node from other clocks of the network.

At 406, method 400 may identify, at the first network node, an ingress port associated with a recipient network node to which the first network node is configured to forward the management message.

At 408, method 400 may determine that the clock ID is associated with the ingress port. For example, the method 400 may access a database that associates the clock ID with the ingress port. The method may also populate the database with information associating the clock ID with the ingress port. For instance, the information may have been included in a previous received message at the first network node and been placed in the database.

At 410, method 400 may, based at least in part on the clock ID being associated with the ingress port, refrain from sending the management message to the ingress port associated with the recipient network node. In some examples, the method 400 may forward the management message to another ingress port that is associated with a different clock ID.

FIG. 5 illustrates a flow diagram of another example method 500 for network devices to perform loop prevention techniques. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may receive, at a first network node, one or more packets sent via an egress port of a second network node, the one or more packets representing a management message. The management message may be associated with a clock synchronization protocol. In some cases, the first network node may be configured to utilize the clock synchronization protocol to synchronize a first clock of the first network node with a second clock of the second network node. The first network node may be configured to receive the management message via a slave port of the first network node and forward the management message via master ports of the first network node to recipient network nodes.

At 504, method 500 may identify, at the first network node and from the one or more packets, a clock identifier (ID) associated with the egress port of the second network node. The clock ID may be associated with a clock of the second network node. The clock ID may differentiate the clock from other clocks.

At 506, method 500 may determine that the clock ID is unknown at the first network node. Method 500 may determine that the clock ID is unknown at the first network node at least in part by accessing a database of the first network node.

At 508, method 500 may, based at least in part on the clock ID being unknown at the first network node, refrain from sending the management message to recipient network nodes.

In some examples, method 500 may further receive, at the first network node, a second management message sent via another egress port of a third network node. Method 500 may identify, at the first network node and from the second management message, another clock ID associated with the other egress port of the third network node. Method 500 may determine that the other clock ID is known at the first network node. Also, method 500 may, based at least in part on the other clock ID being known at the first network node, send the second management message to at least one of the recipient network nodes.

FIG. 6 illustrates a flow diagram of an example method 600 for network devices to perform loop prevention techniques. In some examples, method 600 may be performed by a computing device comprising one or more processors and one or more non-transitory computer-readable media storing computer-executable instructions that, when executed by the one or more processors, cause the one or more processors to perform method 600.

At 602, method 600 may receive, at a first network node, one or more packets sent via an egress port of a second network node, the one or more packets representing a management message. In some examples, the management message may be a GET, SET, Response, Command, and/or Acknowledge message of a clock synchronization protocol. For instance, the management message may be part of the Precision Time Protocol (PTP), also known as IEEE 1588 or IEC61588.

At 604, method 600 may identify, at the first network node, a first ingress port of a third network node to which the first network node is configured to forward the management message.

At 606, method 600 may forward the management message to the first ingress port of the third network node.

At 608, method 600 may identify, at the first network node, a clock identifier (ID) associated with the first ingress port.

At 610, method 600 may identify, at the first network node, a second ingress port to which the first network node is configured to forward the management message.

At 612, method 600 may determine that the clock ID associated with the first ingress port matches the clock ID associated with the second ingress port.

At 614, method 600 may, based at least in part on the clock ID of the first ingress port matching the clock ID of the second ingress port, refrain from forwarding the management message to the second ingress port.

In some examples, method 600 may further identify, at the first network node, a third ingress port to which the first network node is configured to forward the management message. Method 600 may determine that the clock ID associated with the first ingress port does not match another clock ID associated with the third ingress port. Also, method 600 may, based at least in part on the clock ID of the first ingress port not matching the other clock ID of the third ingress port, forward the management message to the third ingress port.

Figure 7:
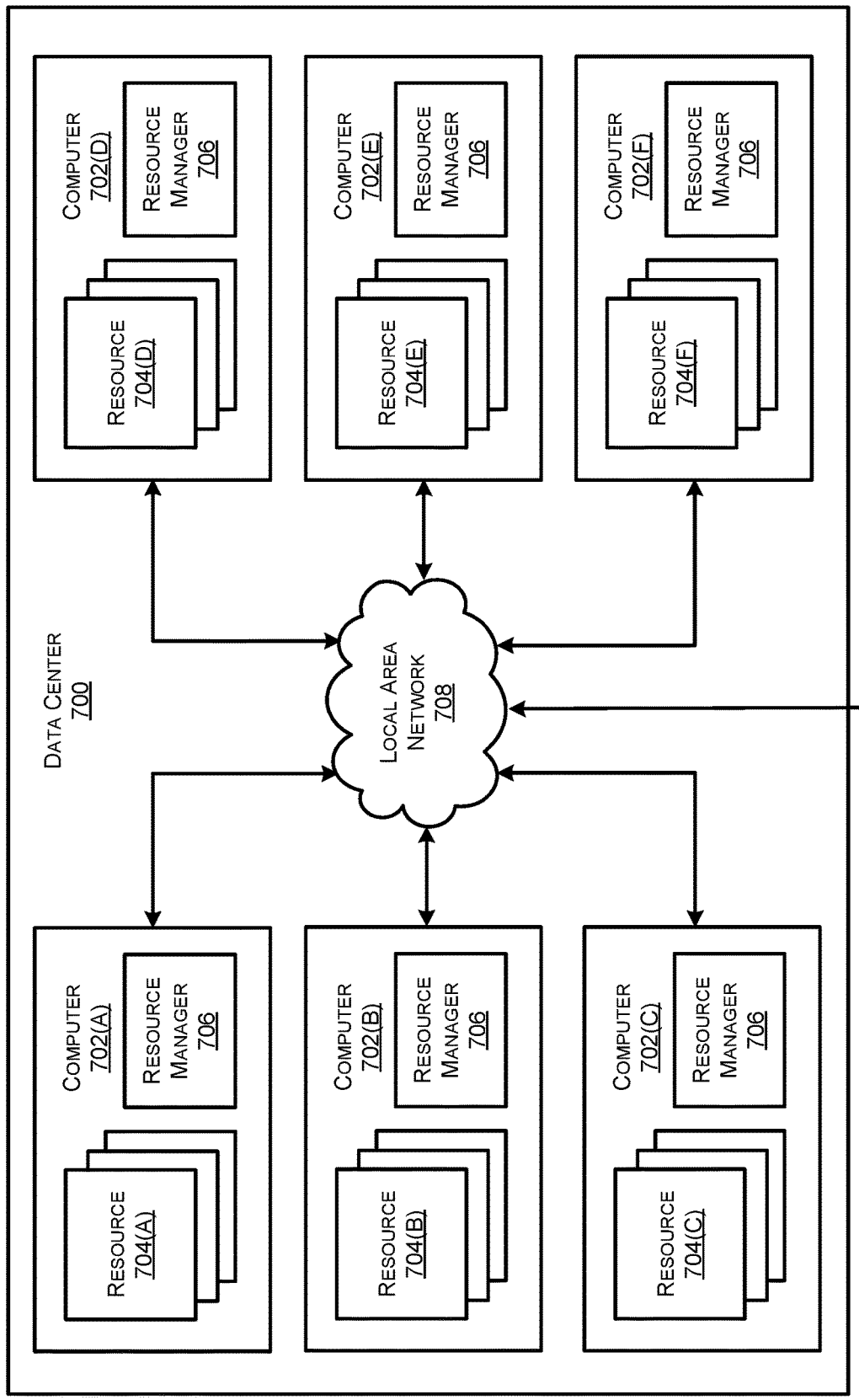
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several computers 702A-702F (which might be referred to herein singularly as "a computer 702" or in the plural as "the computers 702") for providing computing resources. In some examples, the resources and/or computers 702 may include, or correspond to, any type of networked device described herein, such as nodes 102, 202, or 302. Although, computers 702 may comprise any type of networked device, such as servers, switches, routers, hubs, bridges, gateways, modems, repeaters, access points, hosts, etc.

The computers 702 can be standard tower, rack-mount, or blade server computers configured appropriately for providing computing resources. In some examples, the computers 702 may provide computing resources 704 including data processing resources such as virtual machine (VM)

instances or hardware computing systems, database clusters, computing clusters, storage clusters, data storage resources, database resources, networking resources, and others. Some of the computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single computer 702. Computers 702 in the data center 700 can also be configured to provide network services and other types of services.

In the example data center 700 shown in FIG. 7, an appropriate local area network (LAN) 708 is also utilized to interconnect the computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the computers 702A-702F in each data center 700, and, potentially, between computing resources in each of the computers 702. It should be appreciated that the configuration of the data center 700 described with reference to FIG. 7 is merely illustrative and that other implementations can be utilized.

In some examples, the computers 702 may each execute one or more application containers and/or virtual machines to perform techniques described herein. For instance, the containers and/or virtual machines may serve as server devices, user devices, routers, and/or nodes 102, 202, or 302.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
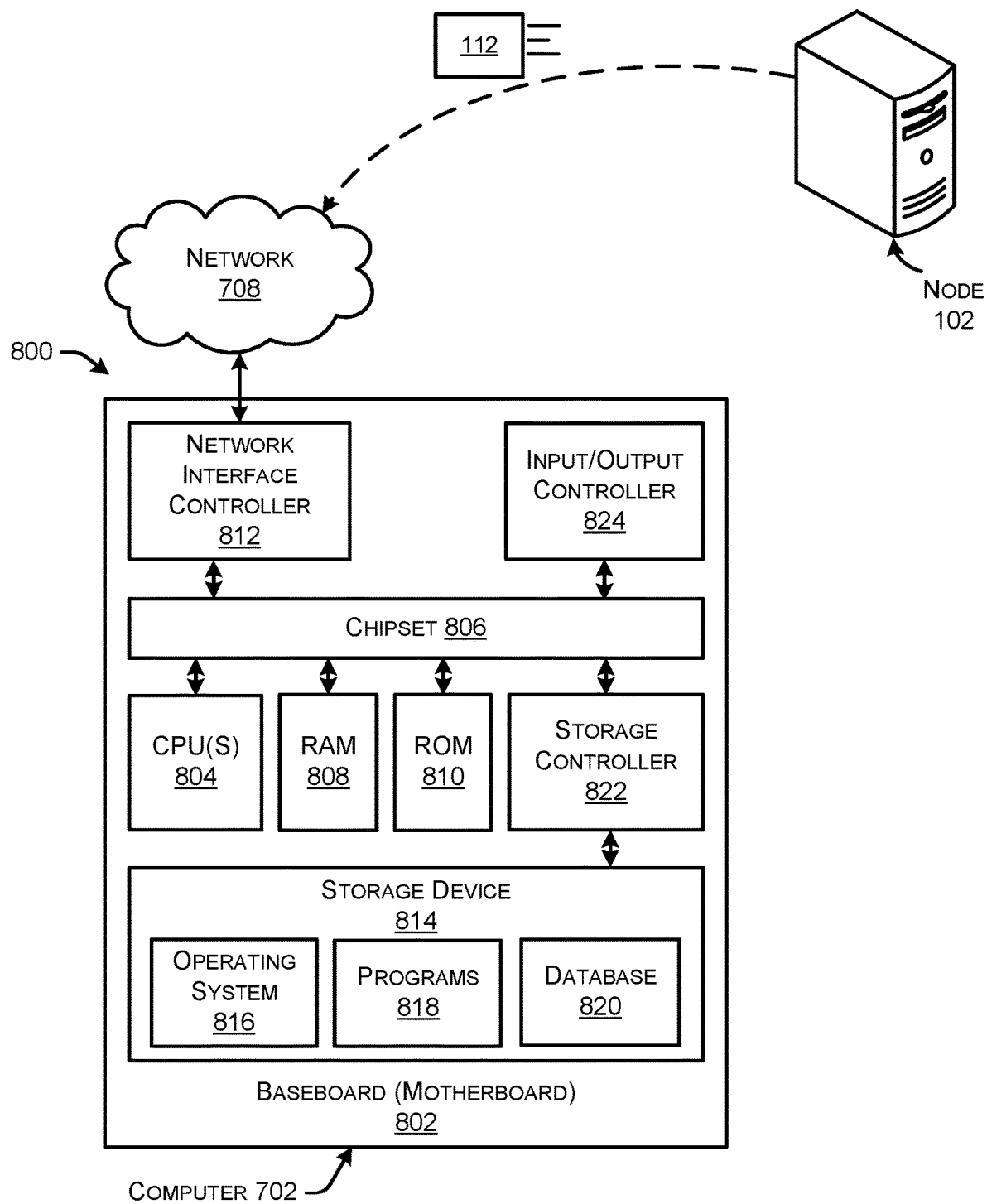
FIG. 8 is a computer architecture diagram showing an illustrative computer hardware architecture for implementing a device that can be utilized to implement aspects of the various technologies presented herein.

FIG. 8 shows an example computer architecture 800 for a computer 702 capable of executing program components for implementing the functionality described above. The computer architecture 800 shown in FIG. 8 illustrates a conventional server computer, workstation, desktop computer, laptop, tablet, network appliance, e-reader, smartphone, and/or other computing device, and can be utilized to execute any of the software components presented herein. The computer 702 may, in some examples, correspond to a physical device described herein (e.g., server device, user device, router, etc.), and may comprise networked devices such as servers, switches, routers, hubs, bridges, gateways, modems, repeaters, access points, etc. For instance, computer 702 may correspond to node 102(1).

As shown in FIG. 8, the computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the networks 708. The chipset 806 can include functionality for providing network connectivity through a network interface controller (NIC) 812, such as a gigabit Ethernet adapter. The NIC 812 is capable of connecting the computer 702 to other computing devices over the network 708. For instance, in the example shown in FIG. 8, NIC 812 may help facilitate transfer of data, packets, and/or communications, such as received management messages 112, over the network 708 with a node 102. It should be appreciated that multiple NICs 812 can be present in the computer 702, connecting the computer to other types of networks and remote computer systems.

The computer 702 can be connected to a storage device 814 that provides non-volatile storage for the computer. The storage device 814 can store an operating system 816, programs 818, a database 820 (e.g., database 220), and/or other data. The storage device 814 can be connected to the computer 702 through a storage controller 822 connected to the chipset 806, for example. The storage device 814 can consist of one or more physical storage units. The storage controller 822 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 814 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 814 is characterized as primary or secondary storage, and the like.

For example, the computer 702 can store information to the storage device 814 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 814 by detecting the physical states or characteristics of one or more particular locations within the physical storage units.

In addition to the mass storage device 814 described above, the computer 702 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 702. In some examples, the operations performed by the network 708, and or any components included therein, may be supported by one or more devices similar to computer 702. Stated otherwise, some or all of the operations performed by the network 708, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 814 can store an operating system 816 utilized to control the operation of the computer 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 814 can store other system or application programs and data utilized by the computer 702.

In one embodiment, the storage device 814 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 402 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The computer 702 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more devices, such as nodes 102, 202, 302, and/or other devices. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by nodes 102, 202, 302, and/or other devices. In some examples, the communications may include management message and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 818 may comprise any type of programs or processes to perform the techniques described in this disclosure in accordance with loop prevention techniques. For instance, the programs 818 may cause the computer 702 to perform techniques for communicating with other devices using any type of protocol or standard usable for determining connectivity. Additionally, the programs 818 may comprise instructions that cause the computer 702 to perform the specific techniques for loop prevention.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
    receiving, at a first network node, one or more packets sent via an egress port of a second network node, the one or more packets representing a management message;
    identifying, at the first network node and from the one or more packets, a clock identifier (ID) associated with the egress port of the second network node;
    identifying, at the first network node, an ingress port associated with a recipient network node to which the first network node is configured to forward the management message;
    determining that the clock ID is associated with the ingress port; and
    based at least in part on the clock ID being associated with the ingress port, refraining from sending the management message to the ingress port associated with the recipient network node.

2. The computer-implemented method of claim 1, wherein the management message is associated with a clock synchronization protocol of a network that includes the first network node and the second network node.

3. The computer-implemented method of claim 2, wherein the clock ID differentiates a clock associated with the second network node from other clocks of the network.

4. The computer-implemented method of claim 2, wherein the first network node and the second network node are configured to utilize the clock synchronization protocol to synchronize a first clock of the first network node with a second clock of the second network node.

5. The computer-implemented method of claim 1, further comprising:
    forwarding the management message to another ingress port that is associated with a different clock ID.

6. The computer-implemented method of claim 1, wherein the determining that the clock ID is associated with the ingress port further comprises:
    accessing a database that associates the clock ID with the ingress port.

7. The computer-implemented method of claim 6, further comprising:
    populating the database with information associating the clock ID with the ingress port.

8. The computer-implemented method of claim 1, wherein the first network node is configured to receive the management message via a slave port of the first network node and forward the management message via master ports of the first network node.

9. A computing device comprising:
    one or more processors; and
    one or more non-transitory computer-readable media storing computer-executable instructions that, when executed by the one or more processors, cause the one or more processors to:
    receive one or more packets sent via an egress port of another computing device, the one or more packets representing a management message;
    identify, from the one or more packets, a clock identifier (ID) associated with the egress port of the another computing device;
    determine that the clock ID is unknown by the computing device; and
    based at least in part on the clock ID being unknown by the computing device, refrain from sending the management message to recipient network devices.

10. The computing device of claim 9, wherein the management message is associated with a clock synchronization protocol.

11. The computing device of claim 10, wherein the computing device is configured to utilize the clock synchronization protocol to synchronize a clock of the computing device with another clock of the another computing device.

12. The computing device of claim 9, wherein the management message comprises at least one of a GET, SET, Response, Command, or Acknowledge message of a clock synchronization protocol.

13. The computing device of claim 9, comprising further computer-executable instructions that, when executed, cause the one or more processors to:
    receive a second management message sent via another egress port of a third computing device;
    identify, from the second management message, another clock ID associated with the another egress port of the third computing device;
    determine that the another clock ID is known at the computing device; and
    based at least in part on the another clock ID being known at the computing device, sending the second management message to at least one of the recipient network devices.

14. The computing device of claim 9, wherein to receive the one or more packets representing the management message comprises receiving the one or more packets via a slave port of the computing device and forward the management message via one or more master ports of the computing device to the recipient network devices.

15. The computing device of claim 14, wherein the clock ID is associated with a clock of the another computing device, the clock ID being unique from other clock IDs associated with other clocks.

16. The computing device of claim 9, wherein to determine that the clock ID is known by the computing device comprises to determine that the clock ID does not correspond to a listing of clock IDs in a database stored at the computing device.

17. A computer-implemented method comprising:
    receiving, at a first network node, one or more packets sent via an egress port of a second network node, the one or more packets representing a management message;

identifying, at the first network node, a first ingress port of a third network node to which the first network node is configured to forward the management message;

forwarding the management message to the ingress port of the third network node;

identifying, at the first network node, a clock identifier (ID) associated with the first ingress port;

identifying, at the first network node, a second ingress port to which the first network node is configured to forward the management message;

determining that the clock ID associated with the first ingress port matches the clock ID associated with the second ingress port; and based at least in part on the clock ID of the first ingress port matching the clock ID of the second ingress port, refraining from forwarding the management message to the second ingress port.

18. The computer-implemented method of claim 17, further comprising:

identifying, at the first network node, a third ingress port to which the first network node is configured to forward the management message;

determining that the clock ID associated with the first ingress port does not match another clock ID associated with the third ingress port; and based at least in part on the clock ID of the first ingress port not matching the another clock ID of the third ingress port, forwarding the management message to the third ingress port.

19. The computer-implemented method of claim 17, wherein the management message is associated with a clock synchronization protocol.

20. The computer-implemented method of claim 19, wherein the management message comprises at least one of a GET, SET, Response, Command, or Acknowledge message of the clock synchronization protocol.

\* \* \* \* \*